United States Patent [19]

Eckel

[11] 4,405,508
[45] Sep. 20, 1983

[54] METHOD OF PRODUCING CERAMIC MATERIAL FOR ZINC OXIDE VARISTORS

[75] Inventor: Max-Ferdinand Eckel, Munich, Fed. Rep. of Germany

[73] Assignee: Siemens Aktiengesellschaft, Berlin & Munich, Fed. Rep. of Germany

[21] Appl. No.: 296,150

[22] Filed: Aug. 25, 1981

[30] Foreign Application Priority Data

Sep. 29, 1980 [DE] Fed. Rep. of Germany ....... 3036617

[51] Int. Cl.³ .............................................. H01B 1/06
[52] U.S. Cl. ..................................... 252/518; 338/20; 264/61; 264/66; 264/104; 75/211; 75/213; 75/221; 75/214
[58] Field of Search ....................... 252/518, 519, 520; 338/20, 21, 307; 264/60, 61, 66; 75/211, 213, 214, 221, 226; 29/610 R; 264/104, 232, 235; 423/617, 627, 87, 99, 115

[56] References Cited

U.S. PATENT DOCUMENTS

| | | | |
|---|---|---|---|
| 4,127,511 | 11/1978 | Kelin et al. | 252/518 |
| 4,147,670 | 4/1979 | Shoha ta et al. | 252/518 |
| 4,165,351 | 8/1979 | May | 252/518 |
| 4,169,071 | 9/1979 | Eda et al. | 252/518 |
| 4,174,303 | 11/1979 | Gaiffi et al. | 252/518 |
| 4,265,844 | 5/1981 | Yokomijo et al. | 252/518 |
| 4,296,002 | 10/1981 | Sokoly et al. | 252/518 |
| 4,297,250 | 10/1981 | Grupta et al. | 252/518 |

*Primary Examiner*—Josephine Barr
*Attorney, Agent, or Firm*—Hill, Van Santen, Steadman & Simpson

[57] ABSTRACT

Zinc oxide ceramic materials having pentavalent antimony therein for use in varistors are produced by adding $Bi_6Zn_4Sb_2O_{12}$, wherein antimony is present in its pentavalent form, to the initial starting materials.

2 Claims, 1 Drawing Figure

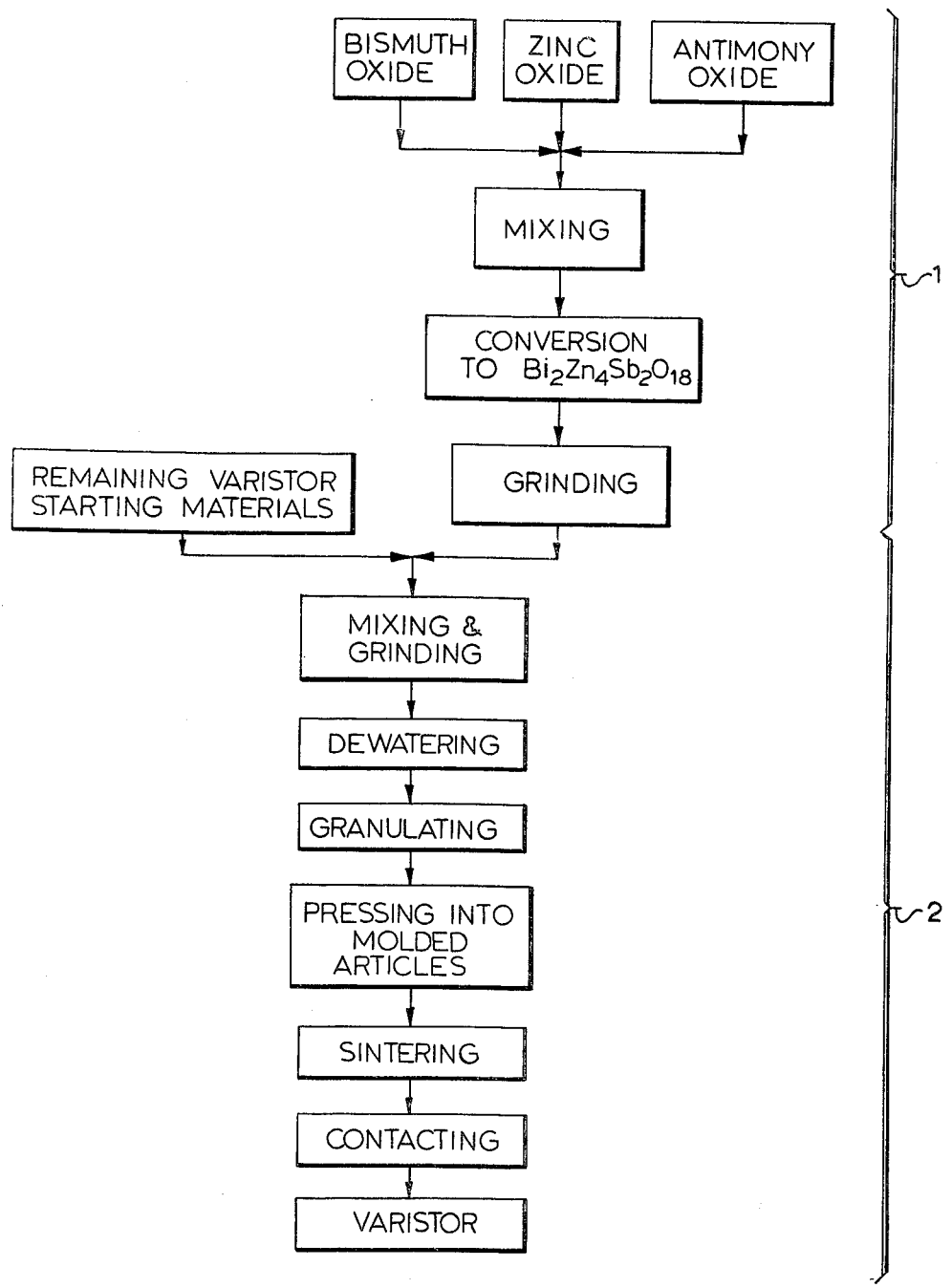

METHOD OF PRODUCING CERAMIC MATERIAL FOR ZINC OXIDE VARISTORS

BACKGROUND OF THE INVENTION

1. Field of the Invention

The invention relates to zinc oxide varistors and somewhat more particularly to a method of producing ceramic materials for such zinc oxide varistors.

2. Prior Art

Varistors are resistors with non-linear current-voltage characteristics. As soon as an electrical voltage connected to a varistor exceeds a specific critical value, the electrical resistance value of such varistor strongly decreases. The current-voltage behavior of a varistor is typically expressed by the equation $I=(U/C)\alpha$, wherein U is the voltage connected to the varistor, I is the current flowing through the varistor, C is a proportionally constant and the exponent $\alpha$ is the non-linear coefficient.

Varistors are increasingly utilized for over-voltage limitations, as protection against power surges and also for voltage stabilization. Older developments provided varistors composed of silicon carbide materials having $\alpha$-values of approximately 3 to 7. More recent developments provide metal oxide varistors, such as for example, composed of zinc oxide materials. With zinc oxide varistors, for example, the varistor effect occurs at considerably lower voltages than with the earlier silicon carbide varistors so that zinc oxide varistors can also be utilized in automotive electronics. Typically, zinc oxide varistors have $\alpha$-values ranging between 15 and 60.

In order to stabilize the varistor effect, particularly the $\alpha$-value at low current density, in addition to a more or less large number of other additives, antimony has been added to zinc oxide starting materials. Antimony produces a stabilizing effect for the electrical properties of zinc oxide materials utilized for varistors.

*J. Appl. Physics*, Vol. 46 (1975) pages 1653–1659 describes investigations relating to microstructure and phase transformation in metal oxide varistor ceramics. According to these investigations, antimony present in the structure of a zinc oxide varistor, is, for example, in a phase thereof corresponding to a $Zn_7Sb_2O_{12}$ spinel in which antimony is in its pentavalent form.

German Offenlegungsschrift No. 27 52 150 (which generally corresponds to U.S. Pat. No. 4,169,071) suggests adding antimony to a zinc oxide starting material in the form of the aforesaid $Zn_7Sb_{12}O_{12}$ spinel, preferably in a defined amount and grain size.

It has been determined that it is favorable for promoting large grain growth in the zinc oxide material to add antimony in its pentavalent form, rather than in its trivalent form. More coursely grained zinc oxide causes varistors containing such course-grained zinc oxide to have relatively low threshold voltage for the varistor effect. It has been shown that it is relatively difficult to produce $Zn_7Sb_2O_{12}$ relative to purity of pentavalent antimony, so that residual components of trivalent antimony ($Sb_2O_3$) (which are disadvantageous for desired properties in zinc oxide materials for varistors materials) are no longer contained therein.

SUMMARY OF THE INVENTION

The invention provides measures with which the advantageous influences of pentavalent antimony in ceramic materials for zinc oxide varistors can be fully achieved, preferably with as low an outlay as possible.

In accordance with the principles of the invention, improved zinc oxide ceramic materials for varistors are attained by adding antimony to the starting materials in the form of a component which corresponds, at least to a great extent, approximately to $Bi_6Zn_4Sb_2O_{18}$.

In the practice of the invention, the desired and/or necessary antimony is added to the initial starting materials for the zinc oxide varistor in a compound, within which it, antimony, is already present in the pentavalent state. Accordingly, such antimony compounds are utilized in which antimony is present only in its pentavalent state and which compounds can be readily produced.

In a parallel development and separate from the aforesaid development, bismuth oxide, which is typically utilized in zinc oxide varistor materials, is replaced in accordance with the principles of the invention by another bismuth compound which is far less volatile so as to avoid a deficiency of bismuth during the varistor production process.

A compound which is ideal and achieves both of the above characteristics is $Bi_6Zn_4Sb_2O_{18}$ which has a pyrochlore structure. The above formula is at least the approximate composition of this bismuth zinc antimony V-compound, in which, on the other hand, minor shifts of the components relative to one another can occur. However, antimony is always present in its pentavalent form and always the bismuth component is volatile only to a comparatively slight degree.

This $Bi_6Zn_4Sb_2O_{18}$ pyrochlore compound can be more readily manufactured than the above described prior art zinc antimony spinel $Zn_7Sb_2O_{12}$. In a preferred embodiment, bismuth oxide, zinc oxide and antimony oxide of select purity are first mixed well with one another in a corresponding stoichiometric amount and are then heated at approximately 800° C. for about 2 hours to attain an orange-yellow conversion product. This conversion product is then uniformly ground into relatively fine-sized particles and added, in the quantity attained, to the remaining initial starting materials for a varistor. The additive components supplied by the inventive addition of bismuth-zinc-antimony are taken into account in the overall composition of this pyrochlore compound. Bismuth oxide, in the form of $Bi_2O_3$ need then be added to the initial materials in only a substantially lesser amount so that bismuth loss due to vaporization of $Bi_2O_3$ occurs in a correspondingly far lesser extent. An advantage attained by following the principles of the invention is that the bismuth component, the antimony component and the zinc component are all introduced into the entire compound already in a pre-mixed state. This provides a more homogeneous mixture of the chief constituent, zinc oxide, with the secondary constituents, and thus also to a more homogeneous final material, with a correspondingly decreased straying or variation of electrical value of zinc oxide varistors produced therefrom.

BRIEF DESCRIPTION OF THE DRAWINGS

The single FIGURE is a schematic flow diagram for producing ceramic materials for zinc oxide varistors in accordance with the principles of the invention.

DESCRIPTION OF THE PREFERRED EMBODIMENTS

In the drawing, the portion of the flow sheet referenced with numeral 1 relates to a specific exemplary embodiment for the production of $Bi_6Zn_4Sb_2O_{18}$ and the other portion designated with reference numeral 2 relates to the actual manufacture of a varistor.

As shown, select amounts of bismuth oxide, zinc oxide, and antimony oxide are admixed with one another to attain a relatively uniform mixture, which is then converted to $Bi_6Zn_4Sb_2O_{18}$. Such conversion occurs by heating the oxide mixture at a temperature of about 800° C. for about 2 hours. The attained reaction product is ground into finely sized particles and added to the remaining varistor starting materials so as to attain a uniform mixture of components having the desired overall composition. During processing, minor amounts of bismuth oxide can be added to compensate for loss thereof during vaporization.

In producing the ceramic material for zinc oxide varistors, the pulverized $Bi_6Zn_4Sb_2O_{18}$ material, which includes the chief component, zinc oxide, and pentavalent antimony, is homogeneously mixed with further conventional additives, such as cobalt oxide, manganese oxide and titanium oxide in a quantitative ratio, as desired. From this mixture, in accordance with known techniques, molded articles or bodies for zinc oxide varistors are then formed, as by pressing, and sintered, for example at temperatures of about 1150° C. for about 1 hours. Further processing of the sintered molded articles, i.e. the application of electrodes and the like, likewise occurs in accordance with known techniques. In this regard, it should be pointed out that certain of the shown steps at sequence 2 are optional. For example, the dewatering step may be omitted if desired.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim as my invention:

1. In a method of producing ceramic materials for zinc oxide varistors wherein such materials contain antimony, which is added to the initial starting materials as a pentavalent compound, the improvement comprising wherein:

said antimony is added in the form of a pyrochlore compound which has the formula: $Bi_6Zn_4Sb_2O_{18}$.

2. A method of producing ceramic materials for zinc oxide varistors comprising:

admixing select amounts of bismuth oxide, zinc oxide and antimony oxide with one another to attain a homogeneous mixture;

converting such mixture to a $Bi_6Zn_4Sb_2O_{18}$ pyrochlore compound by heating said oxide admixture at a temperature of about 800° C. for a period of time of about 2 hours;

subjecting such compound to grinding so as to attain relatively uniform fine-size particles of such compound;

adding the remaining varistor starting materials to such pulverized particles; and producing a varistor therefrom.

* * * * *